United States Patent

Issler

[11] Patent Number: 6,014,404
[45] Date of Patent: Jan. 11, 2000

[54] PROCEDURE FOR THE INDEPENDENT REDUCTION OF ACQUISITION THRESHOLDS AND TRACKING OF SPREAD SPECTRUM CODES RECEIVED IN ORBIT

[75] Inventor: Jean Luc Issler, St. Orens, France

[73] Assignee: Centre National D'Etudes Spatiales, Paris, France

[21] Appl. No.: 08/875,346

[22] PCT Filed: Nov. 26, 1996

[86] PCT No.: PCT/FR96/01870

§ 371 Date: Jul. 28, 1997

§ 102(e) Date: Jul. 28, 1997

[87] PCT Pub. No.: WO97/20227

PCT Pub. Date: Jun. 5, 1997

[30] Foreign Application Priority Data

Nov. 27, 1995 [FR] France ................................. 95 14031

[51] Int. Cl.[7] .................................................. H04B 15/00
[52] U.S. Cl. ........................ 375/200; 375/206; 375/208; 342/120; 342/357
[58] Field of Search ................................... 375/200, 206, 375/208; 342/357, 120; 370/479; 701/214, 213, 120

[56] References Cited

U.S. PATENT DOCUMENTS

| | | | |
|---|---|---|---|
| 4,806,935 | 2/1989 | Fosket et al. | 342/120 |
| 5,101,416 | 3/1992 | Fenton et al. | 375/206 |
| 5,760,738 | 6/1998 | Kawano | 342/357 |

FOREIGN PATENT DOCUMENTS 61-076972  4/1986  Japan ................................ H03L 7/06

*Primary Examiner*—Stephen Chin
*Assistant Examiner*—Shuwang Liu
*Attorney, Agent, or Firm*—Oblon, Spivak, McClelland, Maier & Neustadt, P.C.

[57] ABSTRACT

A procedure for independently reducing acquisition thresholds and tracking spread spectrum codes received in orbit by a receiver accessing an orbital navigator (internal or external to said receiver), wherein the receiver includes a phase loop and a code loop. The code loop that tracks the pseudo-random codes is "impelled" by a fine velocity aid and corrects the error between the real and calculated velocities. The code loop receiving pseudo-random codes is similarly "impelled" by the fine velocity aid, the code phase search being based on a phase prediction maintained by the fine velocity aid provided by the orbital navigator.

6 Claims, 3 Drawing Sheets

PROCEDURE FOR THE INDEPENDENT REDUCTION OF ACQUISITION THRESHOLDS AND TRACKING OF SPREAD SPECTRUM CODES RECEIVED IN ORBIT

DESCRIPTION

1. Field of the Invention

The present invention relates to a procedure for the independent reduction of acquisition thresholds and tracking of spread spectrum codes received in orbit.

2. State of the Prior Art

The invention combines three basic elements:

a spread spectrum signal receiver, an on-board orbitography filter, a technique for reducing thresholds using a fine radial velocity aid.

Each of these elements will be considered below.

The receiver may be any type of satellite-mounted equipment capable of receiving spread spectrum signals (see references [1], [2], [5]). Said signals may be transmitted by other orbiting satellites or from terrestrial transmitters. The receivers may, for example, be of any of the following types:

GPS, GLONASS, GNSSA, GNSS2 receivers, spread spectrum transponder,

DORIS NG receiver.

The GPS and GLONASS satellite constellations are described in references [3] and [4] respectively.

GNSS1 designates the geostationary equipment complementing GPS and/or GLONASS using the navigation packages of the INMARSAT 3 satellites. GNSS2 designates the future civil constellation of navigation satellites.

DORIS NG designates a planned global radionavigation and spatial radiolocalization system, based particularly on the use of spread spectrum signals transmitted by terrestrial beacons and received by orbiting satellites.

The orbitography filter is a digital processing system located in the receiver, for example. It uses raw measurements taken by receivers, i.e. pseudodistance and pseudovelocity measurements relative to ground-based or orbiting spread spectrum signal transmitters. These measurements are processed to give independently determined parameters for the orbit and/or the position and velocity of the carrier satellite. Definitions of these measurements are given in reference [5]. The filter may be one of the following types that are given as examples:

Kalman filter (see reference [6]), single least squares filter, recursive least squares filter.

This filter is also capable of determining the following parameters:

$D_i$=Distance between the satellite and transmitter No. i $\Delta T_i$=Time difference between receiver clock and clock of transmitter No. i.

$Vi=\dot{D}_i$=Radial velocity between the satellite and transmitter No. i.

$\Delta \dot{T}_i$=Relative deviation between clock of transmitter No. i and receiver clock, where a "dot" above a variable signifies the driviative of the variable with respect to time.

The clock can therefore estimate pseudodistances $PD_i$ and pseudovelocities $PV_i$.

$PD_i=Di+C. \Delta T_i$ $PV_i=Vi+C. \Delta \dot{T}_i$

The given magnitudes can be estimated even if the signals transmitted by transmitter No. i are not processed by the receiver and its associated navigation filter provided the position, velocity and clock coefficients of said transmitter can be estimated or established.

The orbital navigator estimates these pseudodistances and pseudovelocities to accuracies of δPD and δPV.

The orbital navigator can receive remote commands describing maneuvers of the carrier satellite. These maneuvers can be described using the parameters ΔVx(t0), ΔVy(t0) and ΔVz(t0) where $\Delta V_i$ represents the components of the velocity pulse at date t0.

Maneuvers are described with an accuracy noted as δVx, δVy, δVz for the three axes. The overall accuracy of the description of the maneuver is δv where $$\delta V = \sqrt{\delta V_x^2 + \delta V_y^2 + \delta V_z^2}$$

The technique of reducing the threshold using a fine radial velocity (or radial pseudovelocity) aid applies where receivers are fitted with one or more phase loops coupled to one or more code loops. It is assumed that said loops use digital technology.

When a signal is received with a signal-to-noise (C/NO) ratio lower than the usual reception threshold in assisted acquisition mode the carrier signal loop is open and the digitally-controlled oscillator (OCN) is driven by an external radial velocity (or pseudovelocity) prediction.

Typical reception in assisted acquisition mode is illustrated in reference [1].

This velocity prediction must be fine and must be provided by a sensor other than the receiver. Typically said sensor may be an inertial unit, for example.

This type of technology is normally used for tracking low equivalent C/NO ratio GPS signals received by military GPS receivers (C/A and P code) embarked on fighter aircraft fitted with inertial units. This technique is described as being "code only" since only the pseudo-random code is tracked down to very low thresholds.

SUMMARY OF THE INVENTION

The present invention relates to a procedure for independently reducing acquisition thresholds and tracking spread spectrum codes received in orbit.

More specifically, the present invention relates to a procedure for independent reducting of acquisition thresholds and tracking spread spectrum codes received in orbit by a receiver accessing an orbital navigator internal or external to said receiver, wherein, the receiver includes a phase loop and a code loop, with the code loop tracking pseudo-random codes and is "impelled" by the velocity aid to correct the error between the real and calculated pseudovelocities. The code loop receives pseudo-random codes and is similarly "impelled" by the fine velocity aid, wherein the code phase search is based on a phase prediction maintained by said velocity aid.

The procedure of the present invention includes the following steps:

receiving, at a receives aids required for normal assisted acquisition, enabling the receiver to receive all signals with a C/No ratio such as C/No>(C/No)$_a$, where (C/No)$_a$ is a reception threshold in normal assisted acquisition mode, and lowering the thresholds of pseudo-random codes to a value (C/No)$_{avf}$, where (C/No)$_{avf}$ is the reception threshold of pseudo-random codes in reception mode assisted by a fine velocity aid, said fine velocity aid being provided by the orbital navigator.

That procedure may further include a preliminary step in which the receiver cold starts without any internal or external assistance or message and receives all signals with a C/No ratio such as C/No>(C/No)$_{na}$ where (C/No)$_{na}$ is the reception threshold in non-assisted mode.

In a maneuver to control the orbit of the satellite the orbital navigator receives a description of said maneuvers and updates the velocity aid supplied by the navigator. In order to continue receiving pseudo-random codes with low C/No ratios during maneuvers, the following condition must be satisfied first and foremost:

$$(\delta PV + \delta V) < \frac{B_{FI}}{f_i} \times C$$

where δPV is the uncertainty of the prediction of the pseudovelocity provided by the navigator in the absence of maneuvers, where $B_{FI}$ is the predetection band, C is the speed of light and $f_i$ the frequency of the carrier signal transmitted by transmitter No. i.

When a pseudo-random code is tracked with a C/No ratio such as (C/No)$_{avf}$<C/No<(C/No)$_3$, the updates of the characteristic parameters of the transmitters are sent to the receiver by means of remote commands external to the system.

The procedure of the invention includes reducing reception and tracking thresholds of spread spectrum codes received by satellite receivers fitted with an on-board orbitography filter. That threshold reduction is achieved independently by the receivers using the invention. The resulting threshold reduction may be spectacular.

DETAILED DESCRIPTION OF EMBODIMENTS

Figure 1:
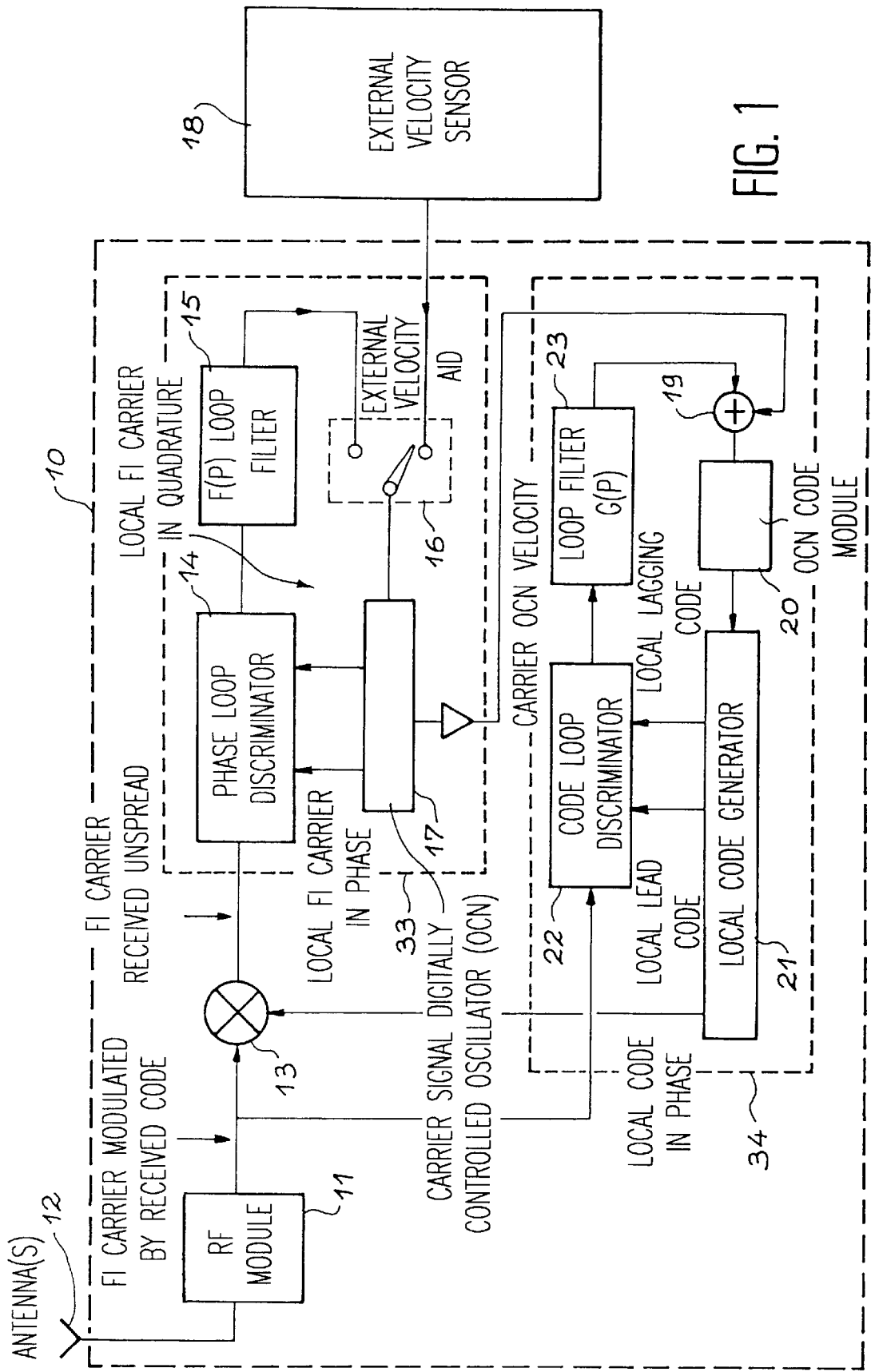
FIG. 1 is a block diagram of a receiver with a threshold reduced by an external fine velocity aid.

FIG. 1 shows a spread spectrum receiver where the threshold is reduced by an external fine velocity aid. Only the digital architecture is shown.

Receiver 10 comprises an RF module 11 connected to an antenna 12 whose output signal is fed into a correlator 13 whose output is in turn connected to a phase loop discriminator 14 followed by a loop filter 15 and a selector switch 16. A carrier signal digitally-controlled oscillator (OCN) 17 transmits a local carrier signal Fi that is in phase and quadrature with discriminator 14 and is connected to another terminal of selector switch 16. The selector switch 16 also receives a signal from an external velocity sensor 18 that may, for example, be a inertial unit.

The carrier signal digitally-controlled oscillator (OCN) transmits an OCN velocity carrier signal to a first input of a summing integrator 19 whose output is connected to an OCN code module 20, and to a local code generator 21. The generator 21 is connected to correlator 13, supplying it with the local code in phase, and to a code loop discriminator 22, supplying it with the local lead and lagging codes, a loop filter G(p) 23 being disposed between the output of discriminator 22 and a second input of summing integrator 19.

Both phase loop 33 and code loop 34 are therefore present.

Tracking

The code loop that tracks the pseudo-random codes is "impelled" by the velocity aid. In other words, the digitally-controlled oscillator (OCN) of this loop causes the local code phase to vary with a velocity equal to the external velocity prediction aid. The "impelled" code loop thus corrects the error between the real and calculated velocities.

This loop should be of an order that is sufficient to maintain the slaving of the digitally-controlled oscillator (OCN), allowing pseudodistance measurements to be generated.

Reception

The code loop that receives pseudo-random codes is also "impelled" by the fine velocity aid. The phase search of the received code is based on a phase prediction (distance prepositioning) maintained by the external velocity aid.

The search zone of the received code phase is smaller than for reception in standard mode. The same applies to the search zone of the received carrier signal frequency. The principle described operates if the uncertainty of the Doppler prediction $\Delta F_p$ is less than the predetection band $B_{FI}$.

The uncertainty δPV of pseudovelocity prediction must therefore comply with the following relations:

$$\Delta F_D < B_{FI} \text{ i.e. } \delta PV < \frac{B_{FI}}{f_i} \times C$$

where C is the speed of light and $f_i$ the frequency of the carrier signal transmitted by transmitter No. i.

Therefore, since zones of uncertainty in Doppler and distance modes are weaker than normal, energy search can be carried out with a much slower local code scan speed than normal for the same search time, noted as T. The reception threshold is thereby lowered. Techniques for rejecting spurious reception must be implemented if several pseudo-random codes with disparate C/No ratios are received simultaneously.

The following C/No ratios are defined:

(C/No)$_{na}$=Reception threshold in non-assisted mode (C/No)$_a$ Reception threshold in normal assisted mode (C/No)$_{avf}$=Reception threshold of pseudo-random codes in reception mode assisted by a fine velocity aid Details of thresholds (C/No)$_{na}$ and (C/No)$_a$ are given in reference [1].

Threshold (C/No)$_{avf}$ is a function of several parameters.

$$(C/No)_{avf}=g(T;\delta PV;B_{FI})$$

The invention is characterized by the following procedure that is implemented in a spread spectrum receiver in a satellite equipped with an orbital navigator.

Stage 1

(optional)

The receiver cold starts without any internal or external aid or message. It receives all signals with a C/No ratio such as:

$$C/No \geq (C/NO)_{na}$$

The first signals received may allow the receiver to:

receive messages used to establish position and/or velocity and/or clock coefficients of transmitters No. i, bring the orbital navigator into convergence using the first pseudodistance and pseudovelocity measurements taken.

This first step is necessary in fully-independent space missions.

Stage 2

The receiver receives aids required for normal assisted acquisition. Said (coarse) aids are fairly imprecise, consisting of the following type of data:

1) Receiver clock date and time.

2) Positions/velocities (or possibly orbital parameters) of the transmitters.

3) Positions/velocities or orbital parameters of the carrier satellite.

These aids may originate wholly or partly from stage 1. In this case they are internal to the receiver (e.g. positions/velocities may be transmitted by said transmitters) and independence of operation is preserved.

Where some or all of these coarse aids are communicated to the receiver by means of external remote commands, the receiver can no longer be said to be independent.

If stage 1 is omitted, said aids are inevitably external to the receiver.

Such coarse aids enable the receiver to receive all signals with a C/No ratio such as:

$$C/No > (C/No)_a$$

The number of pseudovelocity and pseudodistance measurements is greater than in stage 1 since:

$$(C/No)\ a > (C/No)_{na}.$$

The number of such measurements is assumed to sufficient to bring the orbital navigator supplying the orbital parameters of the carrier satellite into convergence with greater accuracy than in stage 1.

Stage 3

Once stage 2 is complete, it is assumed that the accuracy of the parameters output by the orbital navigator and the parameters characteristic of the transmitters is compatible with the accuracy of the velocity aid required to further lower the reception thresholds of the pseudo-random codes to the value $(C/No)_{avf}$.

Figure 2:
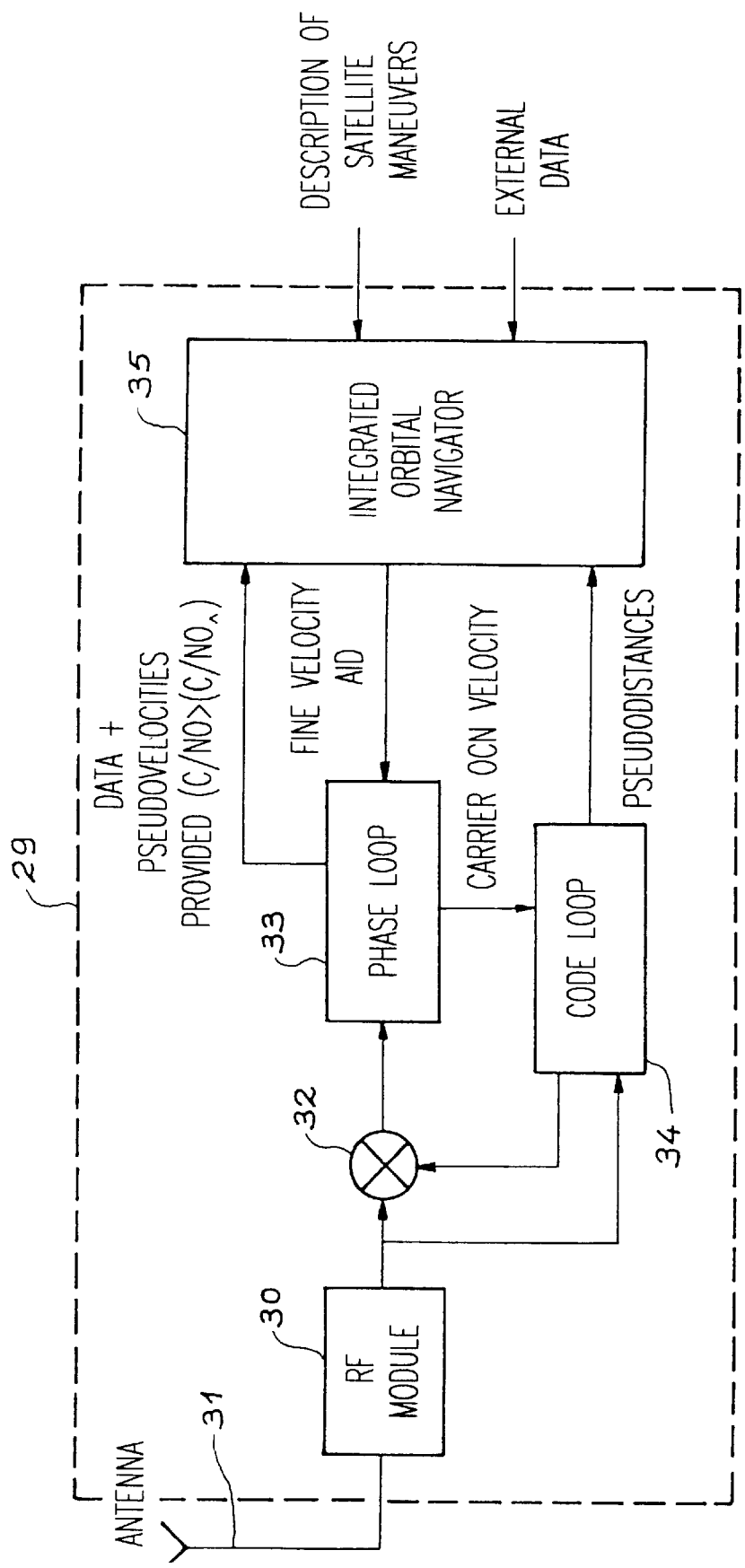
FIG. 2 is a block diagram of a receiver incorporating the apparatus according to the invention.

In contrast with systems using the known art, the fine velocity aid is provided by the orbital navigator integrated into the receiver. This aid is thus internal and independence is preserved, as shown in FIG. 2.

The accuracy of the navigator may thus be improved. Moreover, where there is progressive deterioration of contact with the transmitters, deterioration of this accuracy may be limited.

The situation is then:

$$(C/No)_{avf} < (C/No)_a$$

Stage 4

In maneuvers aimed at controlling the orbit of the satellite, the orbital navigator receives a description of said maneuvers and updates the velocity aid provided by the navigator.

In order that pseudo-random codes with low C/No ratios may continue to be received during maneuvers the following condition must be satisfied first and foremost:

$$(\delta PV + \delta V) < \frac{B_{Fl}}{f_i} \times C$$

where δPV is the pseudovelocity prediction provided by the navigator where no maneuvers are present.

Stage 5

When a pseudo-random code is tracked with a C/No ratio such as:

$$(C/No)_{avf} < C/No < (C/No)_a$$

demodulation of message data sent by the transmitters is not possible.

Such demodulation should, in fact, be effected by the carrier signal loop (phase loop). This loop is, in fact, open when the C/No ratio complies with the double inequality cited above.

Updates of the characteristic parameters of the transmitters (positions and/or velocities and/or clock coefficients) must therefore be communicated to the receiver using external remote control means. For example, in a GPS or GLONASS receiver these parameters may be the ephemerides of the constellation used.

FIG. 2 shows a spread spectrum satellite receiver 29 comprising an RF module 30 receiving a signal from an antenna 31 and connected to a first input of a correlator 32 followed by a phase loop 33 connected to a code loop 34 that also receives the output signal from RF module 30 and whose output is connected to a second input of correlator 32, and an integrated orbital navigator 35 that receives data and pseudovelocities from the phase loop provided $(C/No) > (C/No)_a$ and that sends the phase loop a fine velocity aid and receives pseudodistances from the code loop.

The integrated orbital navigator receives the description of the satellite maneuvers and external data.

Figure 3:
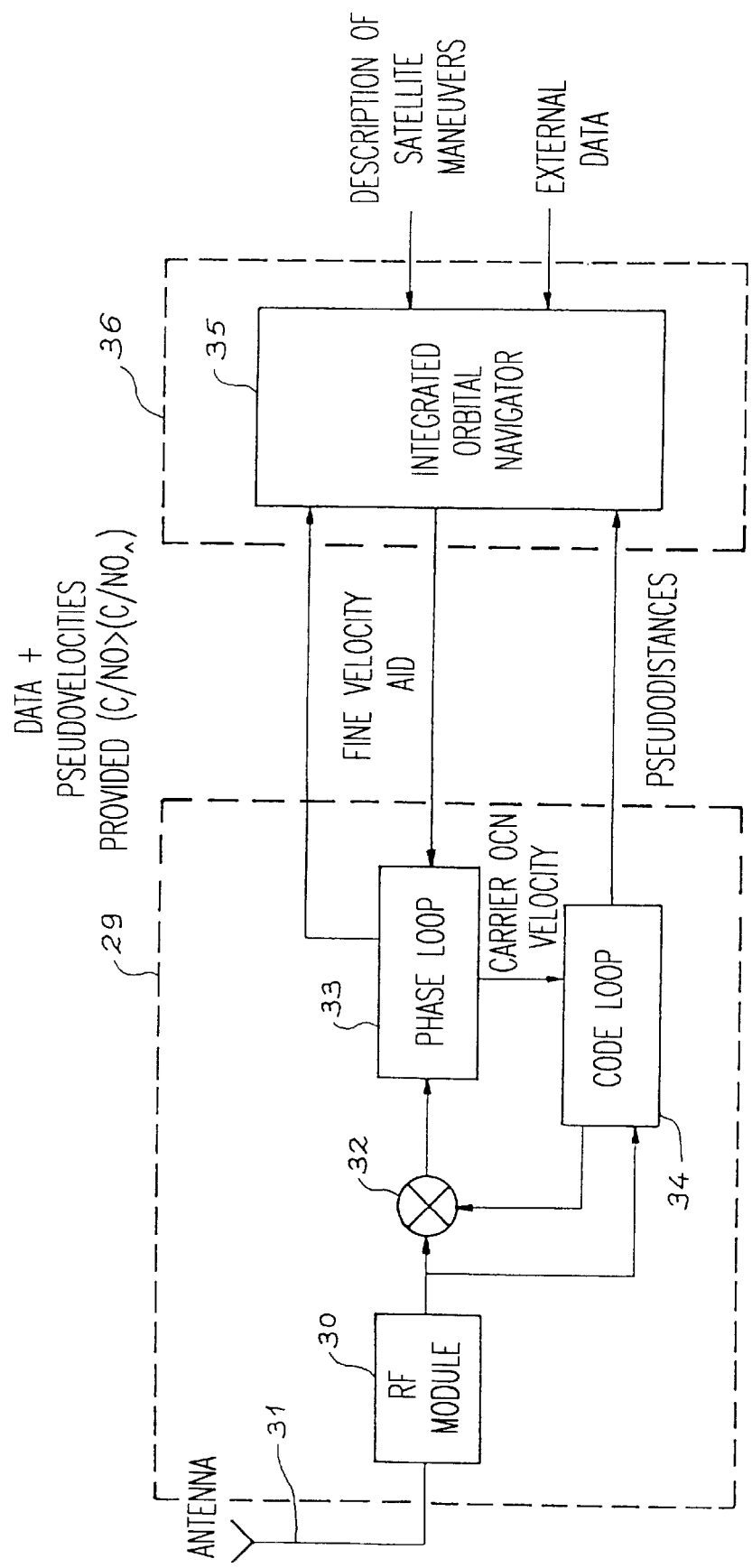
FIG. 3 illustrates a variant of the invention.

FIG. 3 shows a variant of the invention wherein the orbital navigator is integrated into an on-board computer 36 present in the satellite.

EXAMPLES OF APPLICATIONS

The applications of the procedure according to the invention to on-board reception of spread spectrum signals concern situations in which there is poor communication between the transmitters used and said satellites.

Such applications may, for example, relate to:

types of receiver

Navigation using a satellite constellation receiver (e.g. GPS, GLONASS).

Navigation using a spread spectrum transponder. Reception may be poor at the beginning and end of overflight of a remote control/remote measurement (TM/TC) station.

Navigation using a receiver of spread spectrum signals transmitted by a group of terrestrial beacons equipped with hemispherical antennas. The power transmitted by said beacons is assumed to be optimized for use by low-orbit satellites. Reception is thus assumed to be poorer for satellites in, for example, geostationary orbit.

Reception in orbit of spread spectrum signals in environments scrambled by unwanted radioelectric transmitters. The equivalent C/No ratio of signals received is reduced compared with a non-scrambled environment. Reception is deteriorated and the procedure according to the invention may be necessary.

Orbits

Navigation using a GPS or DORIS NG receiver in geostationary transfer orbit. The geostationary transfer orbit may be any of the following types:

normal geostationary transfer orbit, supersynchronous orbit, subsynchronous orbit, drift orbit.

These types of navigation may be performed using two low-gain antennas if the reception threshold of the signals is low (see reference [7]).

Navigation using a receiver in high-apogee orbit, for example any of the following (see reference [8]):

Molniya orbit,

Tundra orbit,

Archimedes orbit.

Navigation using a receiver in circular orbit for a constellation of navigation satellites with a period of the order of twelve hours. Terrestrial beacons with hemispherical antennas are suitable for this application.

Navigation using a low-orbit receiver connected to one or more reception antennas that are low-cost and therefore not optimized, but efficient enough to enable the receiver to effect stage 2 described above.

REFERENCES

[1] "Orbital Navigation with a GPS Receiver on the HETE Spacecraft" (ION GPS January 1994, pages 645–656).

[2] "ESA Dual-Standard S-Band Transponder: A Versatile TT&C Equipment for Communications Via a Data Relay Satellite or Directly with the Ground Network" by J. L. Gerner (42nd Congress of The International Astronautical Federation, 5–11 Oct. 1991).

[3] "Accord de standardisation; caractéristiques due systéme mondial de détermination de la position NAVSTAR (GPS)" (Standardization Agreement: Characteristics of the NAVSTAR Global Positioning System (GPS)), (NATO, STANAG 4294.

[4] "GLONASS Approaches Full Operational Capability (FOC)" by P. Daly (ION GPS, September 1995).

[5] "Techniques et technologies des vehicules spatiaux module 6. Localisation spatiale" (Techniques and technology of space vehicles, module 6. Space tracking), Editions Cépaduès.

[6] "Low-Orbit Navigation Concepts" by H. James Rome (vol. 35, No. 3, Fall 1988, pages 371–390).

[7] "GPS Techniques for Navigation of Geostationary Satellites" by P. Ferrage, J. L. Issler, G. Campan and J. C. Durand (ION GPS, 12–15 September 1995).

[8] "Applicability of GPS-Based Orbit Determination Systems to a Wide Range of HEO Missions" by J. Potti, P. Bernedo and A. Pasetti, (ION GPS, 12–15 September 1995).

I claim:

1. A method for independently reducing acquisition thresholds and tracking spread spectrum codes received in orbit by a receiver accessing an orbital navigator, wherein the receiver includes a phase loop and a code loop, the method comprising the steps of:

receiving, in the receiver from the orbital navigator, a fine velocity aid required for normal assisted acquisition, enabling the receiver to receive all signals with a signal-to-noise (C/No) ratio when $C/No > (C/No)_3$, where $(C/No)_3$ is a reception threshold in normal assisted acquisition mode:

tracking, using the code loop, pseudo-random codes;

correcting an error between real and calculated velocities by using the fine velocity aid, searching for a code phase based on a phase prediction maintained by the fine velocity aid provided by the orbital navigator; and lowering thresholds of the pseudo-random codes to a value $(C/No)_{avf}$, wherein $(C/No)_{avf}$ is a reception threshold of pseudo-random codes in acquisition mode assisted by the fine velocity aid provided by the orbital navigator.

2. The method as claimed in claim 1, further comprising a preliminary step of cold starting the receiver without any assistance or message and receiving signals with a C/No ratio when $C/No \geq (C/No)_{na}$, where $(C/N)_{na}$ is the reception threshold in non-assisted mode.

3. The method as claimed in claim 1, further comprising the steps of:

receiving in the orbital navigator, during a maneuver to control the orbit of the receiver, a description of the maneuver: and updating the velocity aid supplied by the orbital navigator, wherein the following condition is satisfied:

$$(\delta PV + \delta V) < \frac{B_{Fl}}{F_i} \times C$$

where δPV is an uncertainty of a prediction of the pseudovelocity provided by the orbital navigator in an absence of the maneuver, and where δV is an accuracy of the description of the maneuver.

4. The method as claimed in claim 1, wherein when a pseudo-random code is tracked with a C/No ratio when $(C/No)_{avf} < C/No < (C/No)_a$, then updates of characteristic parameters of transmitters are sent to the receiver using remote commands external to the system.

5. The method as claimed in claim 1, wherein the step of receiving comprises receiving the fine velocity aid from the orbital navigator that is internal to the receiver.

6. The method as claimed in claim 1, wherein the step of receiving comprises receiving the fine velocity aid from the orbital navigator that is external to the receiver.

* * * * *